(12) United States Patent
Chen et al.

(10) Patent No.: US 11,894,578 B2
(45) Date of Patent: Feb. 6, 2024

(54) BATTERY MODULE, BATTERY PACK AND VEHICLE

(71) Applicant: Contemporary Amperex Technology Co., Limited, Ningde (CN)

(72) Inventors: Sien Chen, Ningde (CN); Shoujiang Xu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 49 days.

(21) Appl. No.: 17/694,724

(22) Filed: Mar. 15, 2022

(65) Prior Publication Data

US 2022/0209371 A1 Jun. 30, 2022

Related U.S. Application Data

(63) Continuation of application No. PCT/CN2020/102649, filed on Jul. 17, 2020.

(30) Foreign Application Priority Data

Sep. 23, 2019 (CN) .......................... 201921586971.3

(51) Int. Cl.
*H01M 50/519* (2021.01)
*H01M 50/249* (2021.01)
(Continued)

(52) U.S. Cl.
CPC ....... *H01M 50/519* (2021.01); *H01M 10/482* (2013.01); *H01M 50/249* (2021.01); *H01M 50/284* (2021.01); *H01M 2220/20* (2013.01)

(58) Field of Classification Search
CPC ............. H01M 50/519; H01M 10/482; H01M 50/249; H01M 50/284; H01M 2220/20;
(Continued)

(56) References Cited

U.S. PATENT DOCUMENTS

2011/0143180 A1* 6/2011 Han ................... H01M 50/505
429/121
2014/0315441 A1* 10/2014 Kinoshita ........... H01M 50/209
439/627
(Continued)

FOREIGN PATENT DOCUMENTS

CN 205091360 U 3/2016
CN 206742363 U 12/2017
(Continued)

OTHER PUBLICATIONS

Machine English translation of JP H11-297373 (Year: 1999).*
(Continued)

*Primary Examiner* — Michael L Dignan
(74) *Attorney, Agent, or Firm* — East IP P.C.

(57) ABSTRACT

The application relates to a battery module, a battery pack and a vehicle. The battery module includes: secondary batteries, in which two or more secondary batteries are arranged side by side in an arrangement direction; a busbar arranged on a top of the secondary batteries and electrically connected to at least two of the secondary batteries; a sampling assembly including a sampling circuit board arranged on the top of the secondary batteries and a sampling leg extending from the sampling circuit board toward the busbar, the sampling leg and the busbar being welded to form a welded zone; a connector, the sampling leg and the busbar being connected by the connector, the connector being located at a side of the welded zone close to the sampling circuit board.

14 Claims, 8 Drawing Sheets

(51) Int. Cl.
*H01M 50/284* (2021.01)
*H01M 10/48* (2006.01)

(58) Field of Classification Search
CPC ............ H01M 50/502; H01M 50/507; H01M 50/516; H01M 50/517; H01M 50/528; H01M 50/569; H01M 50/209; Y02E 60/10; H01R 43/02; H01R 43/0263
See application file for complete search history.

(56) References Cited

U.S. PATENT DOCUMENTS

| | | | | |
|---|---|---|---|---|
| 2015/0072195 A1* | 3/2015 | Soleski | ............... | B60L 50/16 |
| | | | | 429/90 |
| 2015/0270666 A1* | 9/2015 | Callicoat | ............... | H01R 43/00 |
| | | | | 439/627 |
| 2015/0333312 A1* | 11/2015 | Nakamoto | .......... | H01M 50/516 |
| | | | | 429/153 |
| 2018/0108898 A1* | 4/2018 | Shoji | ............... | H01M 10/425 |
| 2018/0117714 A1* | 5/2018 | Scherer | ............... | H01M 50/51 |
| 2018/0354231 A1* | 12/2018 | Iwase | ............... | B32B 15/016 |
| 2019/0348720 A1* | 11/2019 | Oh | ............... | H01M 50/567 |
| 2022/0013868 A1* | 1/2022 | Takahashi | ............ | H01M 50/50 |
| 2022/0328925 A1* | 10/2022 | Kuboki | ............... | H01G 11/10 |

FOREIGN PATENT DOCUMENTS

| | | | | | |
|---|---|---|---|---|---|
| CN | 207800674 U | | 8/2018 | | |
| CN | 109301143 A | | 2/2019 | | |
| CN | 210467965 U | | 5/2020 | | |
| DE | 102017217688 | * | 10/2018 | ............ | H01R 43/00 |
| JP | H09-213387 | * | 8/1997 | ............... | H01R 9/09 |
| JP | H11297373 A | | 10/1999 | | |
| JP | 2000285999 A | | 10/2000 | | |
| JP | 2014060074 A | | 4/2014 | | |
| JP | 6164489 B2 | | 7/2017 | | |
| JP | 2018067700 A | | 4/2018 | | |
| KR | 20190061378 A | | 6/2019 | | |
| WO | WO 2018-124494 | * | 7/2018 | ............ | H01M 2/10 |

OTHER PUBLICATIONS

Machine English translation of JP H09-213387 (Year: 1997).*
The extended European search report for European Application No. 20870123.5, dated May 9, 2022, 9 pages.
The Communication pursuant to Article 94(3) EPC for European Application No. 20870123.5, dated Oct. 26, 2022, 6 pages.
The International search report for PCT Application No. PCT/CN2020/102649, dated Oct. 20, 2020, 13 pages.

* cited by examiner

C-C

A

BATTERY MODULE, BATTERY PACK AND VEHICLE

CROSS REFERENCE TO RELATED APPLICATION

The application is a continuation of International Patent Application No. PCT/CN2020/102649, filed on Jul. 17, 2020, which claims priority to Chinese Patent Application No. 201921586971.3, filed on Sep. 23, 2019, entitled "Battery Module, Battery Pack and Vehicle", both of which are hereby incorporated by reference in their entireties.

FIELD

The invention relates to the field of battery technology, and in particular to a battery module, a battery pack and a vehicle.

BACKGROUND

A battery module includes a plurality of secondary batteries arranged side by side. It is necessary to collect the voltage of each secondary battery included in the battery module in use. At present, a circuit board assembly is usually used to perform the pressure collection, and therefore the reliability of the secondary battery voltage collection depends on that of the circuit board assembly. The circuit board assembly is welded, through a connection sheet, such as a nickel sheet, to a busbar connected with the secondary batteries. However, a secondary battery may expand in use, and then there is a possibility for the circuit board assembly and the busbar jointly stretch the connector to cause the connection sheet to be broken at a welded position, thereby making it impossible for the circuit board assembly to perform the collection normally.

SUMMARY

Embodiments of the application provide a battery module, a battery pack and a vehicle. The sampling leg and the busbar included in the battery module are connected and fixed by the welded zone, and a connection structure is formed at the side of the welded zone by the connector. The connection structure can decompose a tensile force, which is beneficial to reduce the tensile force borne by the welded zone and reduce the possibility of tearing or breaking of the sampling leg in the welded zone.

In one aspect, an embodiment of the application provide a battery module including secondary batteries, a sampling assembly, and a connector. Two or more secondary batteries are arranged side by side in an arrangement direction. A busbar is arranged on a top of the secondary batteries and electrically connected to at least two of the secondary batteries. The sampling assembly includes a sampling circuit board and a sampling leg. The sampling circuit board is arranged on the top of the secondary batteries. The sampling leg extend from the sampling circuit board toward the busbar. The sampling leg and the busbar are welded together to form a welded zone. The sampling leg is connected to the busbar via the connector. The connector is located on a side of the welded zone close to the sampling circuit board.

According to the above embodiment of the application, the sampling leg is movably connected to the connector, or the sampling leg is fixedly connected to the busbar by the connector.

According to the above embodiment of the application, the busbar includes a first through hole and the sampling leg includes a second through hole, the connector being a riveting member passing through the first through hole and the second through hole, the sampling leg and the busbar being riveted by the connector.

According to the above embodiment of the application, the first through hole and the second through hole are arranged in corresponding positions, the first through hole being a circular hole, the second through hole being a waist hole, a diameter of the first through hole being smaller than a width of the second through hole; or the first through hole and the second through hole are arranged in corresponding positions, the first through hole and the second through hole being both circular holes, the diameter of the first through hole being smaller than a diameter of the second through hole.

According to the above embodiment of the application, the connector includes a buckle, one of the sampling leg and the busbar including a snap-in portion, and the other being connected to the connector, the buckle being engaged with the snap-in portion in order to connect fixedly the sampling leg to the busbar.

According to the above embodiment of the application, the connector includes a post, one of the sampling leg and the busbar being connected to the post, and the other being provided with a recess for plug-in connection with the post.

According to the above embodiment of the application, the welded zone is a structure extending linearly in the arrangement direction X.

According to the above embodiment of the application, the connector includes a columnar portion with a central axis, the sampling leg and the busbar being both connected to the columnar portion, the welded zone being an arc-shaped structure surrounding the columnar portion.

According to the above embodiment of the application, a center of the welded zone coincides with the central axis, the welded zone being one fifth to one half of a circle.

According to the above embodiment of the application, there is provided with two or more welded zones spaced apart in a direction away from the connector.

According to the above embodiment of the application, the battery module further includes an adhesive member, the connector being connected to the adhesive member.

During use of the battery module according to the embodiments of the application, the secondary batteries may undergo expansive deformation or vibration deformation, thereby causing a positional change of the secondary batteries. As a result, the secondary batteries may drive the sampling circuit board to move, so that the busbar and the sampling circuit board jointly apply a tensile force to the sampling leg. The sampling leg and the busbar in the embodiments include the welded zone formed by welding and a connection structure jointly formed by the sampling leg, the busbar and the connector. Since the connection structure is closer to the sampling circuit board than the welded zone, when the sampling leg is subjected to a tensile force, the tensile force first acts on the connection structure, and is decomposed by the connection structure, so that a stress acting on the welded zone is smaller than a stress acting on the connection structure. In this way, the connection manner of the sampling leg and the busbar of the embodiments is advantageous to reduce the possibility of tearing or breaking of the sampling leg at the welded zone, thereby facilitating improvement of use safety of the battery module.

In another aspect, an embodiment of the application provides a battery pack including the battery module according to the above embodiments.

In still another aspect, an embodiment of the application provides a vehicle including a power source and a battery module according to the above embodiments. The power source is used to provide driving force to the vehicle. The battery module according to the above embodiments is configured to supply electric energy to the power source.

BRIEF DESCRIPTION OF THE DRAWINGS

The features, advantages and technical effects of the exemplary embodiments of the application will be described below with reference to the drawings.

Figure 1:
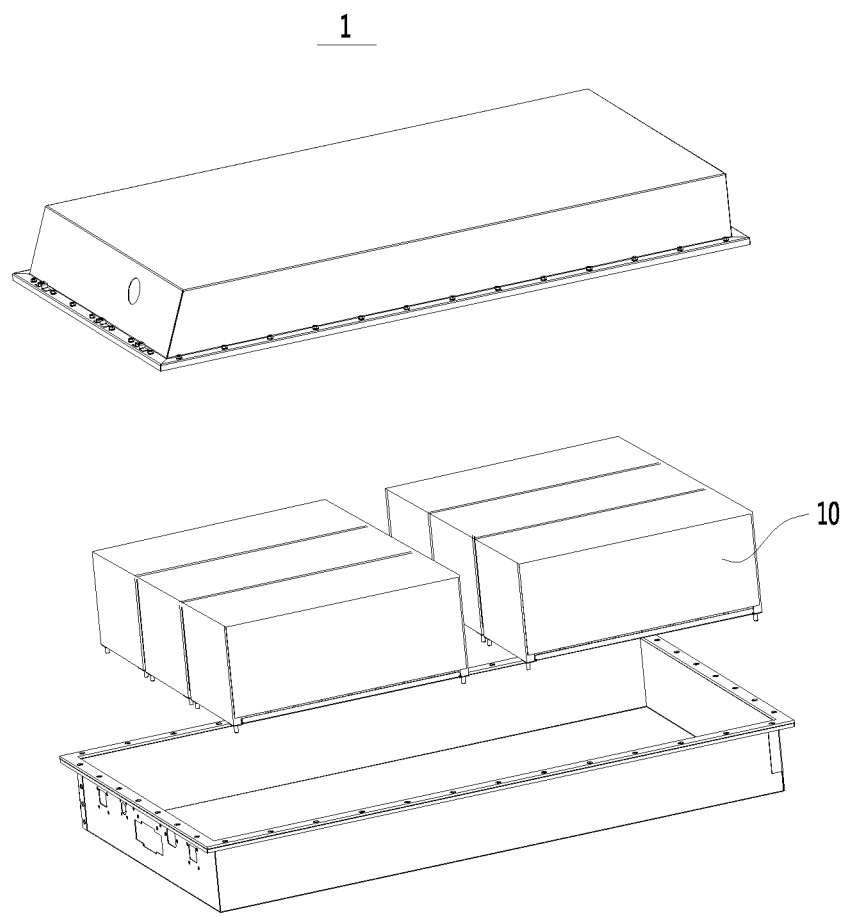
FIG. 1 is an exploded structural view of a battery pack according to an embodiment of the application.

The views are not necessarily plotted in actual proportion in the drawings.

LIST OF REFERENCES 1 battery pack;
10 battery module;
20 secondary battery;
30 busbar; 31 first through hole;
40 sampling assembly; 41 sampling circuit board; 42 sampling leg; 421 second through hole;
50 welded zone;
60 connector; 61 columnar portion; 62 buckle;
70 post;
80 recess;
90 adhesive member;
X arrangement direction.

DETAILED DESCRIPTION

The implementation of the application will be further described in detail below in combination with the drawings and embodiments. The following detailed description of the embodiments and drawings is used to exemplarily explain the principle of the application, rather than limiting the scope of the application, that is, the application is not limited to the described embodiments.

In the description of the application, it is noted that, except as otherwise noted, the term "a plurality of" means two or more; the orientation or position relationship indicated by the terms "above", "below", "left", "right", "in", "out" is only for the purpose of brief description of the application, rather than indicating or implying that the noted unit or element is necessarily of the specific orientation or structured or operated in the specific orientation, thus, cannot be regarded as limit of the invention. In addition, the terms such as "first", "second" and the like are only for the purpose of description, and shall not be deemed to indicate or imply relative importance.

In the description of the application, it is also noted that, except as otherwise stipulated or limited explicitly, the terms "mount", "link", "connect" shall be interpreted expansively, for example, it may be fixed connection, removable connection or integral connection; may be direct connection or indirect connection via an intermediate medium. For a person of ordinary skill in the art, the specific meaning of the above terms in the application can be interpreted depending on the specific situation.

For better understanding of the application, embodiments of the application will be described below in detail in combination with FIGS. 1 to 12.

Figure 2:
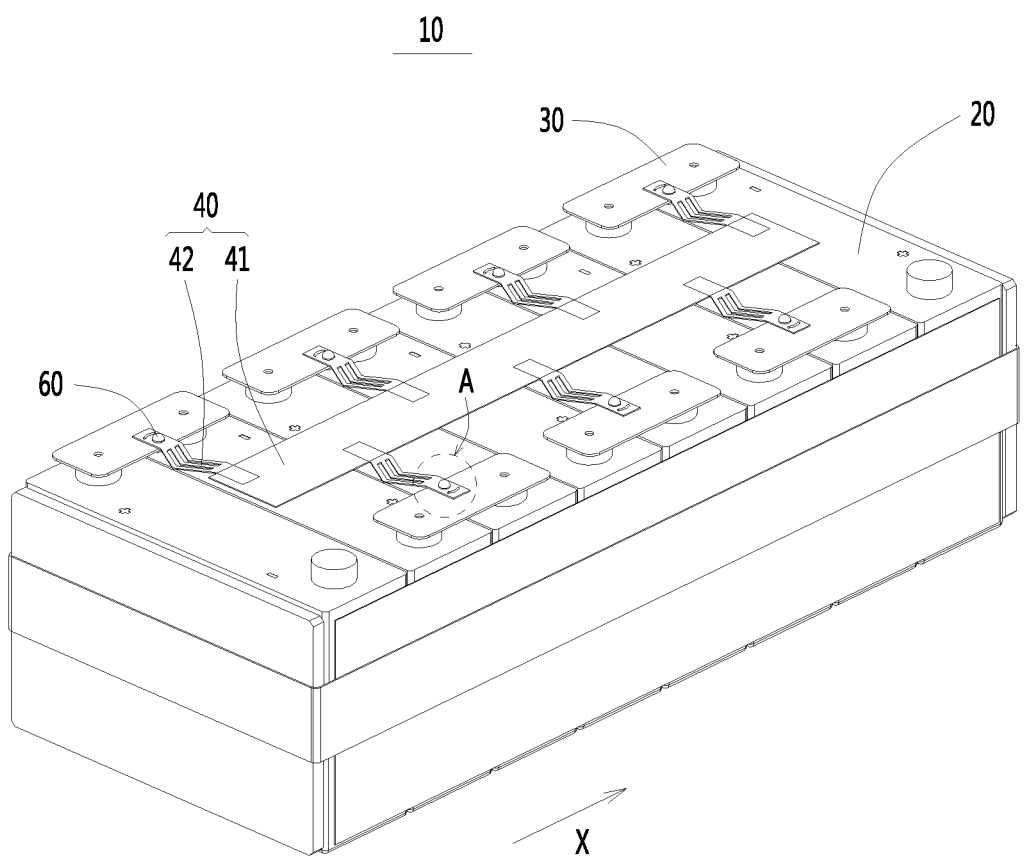
FIG. 2 is a schematic structural view of a battery module according to an embodiment of the application.

As shown in FIGS. 1 and 2, an embodiment of the application provides a battery pack 1. The battery pack 1 includes a housing and a battery module 10 disposed in the housing. The battery module 10 includes secondary batteries 20, a busbar or busbars 30, a sampling assembly 40, and a connector or connectors 60. Two or more secondary batteries 20 are arranged side by side in an arrangement direction X. Each secondary battery 20 has a predetermined length, a predetermined width, and a predetermined height. The arrangement direction X is the same as a width direction of the secondary battery 20. Each busbar 30 is arranged on the top of the secondary batteries 20, and are electrically connected to at least two secondary batteries 20, so that a plurality of secondary batteries 20 connected by one busbar 30 are connected to each other in series or in parallel. The sampling assembly 40 includes a sampling circuit board 41 and a sampling leg or sampling legs 42. The sampling circuit board 41 is arranged on the top of the secondary batteries 20. The sampling leg 42 extends from the sampling circuit board 41 toward the respective busbar 30. The sampling leg 42 and the busbar 30 are welded together to form a welded zone 50 for electrical connection of the sampling leg 42 and the busbar 30. At the same time, the sampling leg 42 is connected to the busbar 30 via a connector 60. The connector 60 is located on a side of the welded zone 50 close to the sampling circuit board 41. Optionally, the connector 60 may be a non-conductive structural part of plastic material or a conductive structural part of metal material. When the connector 60 is an electrically conductive structural part, the sampling leg 42 and the busbar 30 can also be electrically connected via the connector 60.

During use of the battery module 10 of the embodiment of the application, the secondary batteries 20 may undergo expansive deformation or vibration deformation, thereby causing a positional change of the secondary batteries 20. As a result, the secondary batteries 20 may drive the sampling circuit board 41 to move, so that the busbar 30 and the sampling circuit board 41 jointly apply a tensile force to the sampling leg 42. In the embodiment, the sampling leg 42 and the busbar 30 include the welded zone 50 formed by welding and a connection structure jointly formed by the sampling leg 42, the busbar 30 and the connector 60. Since the connection structure is closer to the sampling circuit board 41 than the welded zone 50, when the sampling leg 42 is subjected to a tensile force, the tensile force first acts on the connection structure, and is decomposed by the connection structure, so that a stress acting on the welded zone 50 is smaller than a stress acting on the connection structure. In this way, the connection manner of the sampling leg 42 and the busbar 30 of the embodiment is advantageous to reduce the possibility of tearing or breaking of the sampling leg 42 at the welded zone 50. At the same time, the possibility of failure of collection function due to breakage of the sampling leg 42 can be reduced, so that the use safety of the battery module 10 can be improved.

In an embodiment, the sampling leg 42 is movably connected to the connector 60. Here, "movably connected" means that the sampling leg 42 is in a loose fit with both the busbar 30 and the connector 60. After the connector 60 connects the sampling leg 42 to the busbar 30, the sampling leg 42 is still movable with respect to the busbar 30 and with regard to the connector 60. When the sampling leg 42 is subjected to a tensile force, the sampling leg 42 can be changed in position relative to the busbar 30, thereby buffering the tensile force to a certain extent and reducing the tensile force to which the welded zone 50 is subjected. In addition, the sampling leg 42 is finally brought into contact with the connector 60, so that the tensile force first acts on the connection structure, and since the tensile force is decomposed by the connection structure, a stress borne by the welded zone 50 is smaller than a stress borne by the connection structure. In another embodiment, the sampling leg 42 is fixedly connected to the busbar 30 by the connector 60. Here, "fixedly connected" means that the sampling leg 42 is in a tight fit with both the busbar 30 and the connector 60. After the connector 60 connects the sampling leg 42 to the busbar 30, the sampling leg 42, the busbar 30 and the connector 60 are in a locked state, so that the sampling leg 42 can move neither relative to the busbar 30 nor relative to the connector 60. When the sampling leg 42 is subjected to a tensile force, the tensile force first acts on the connection structure, so that a stress borne by the welded zone 50 is smaller than a stress borne by the connection structure due to decomposition by the connection structure. In this way, with the connector 60 provided on a side of the welded zone 50, the sampling leg 42, the busbar 30 and the connector 60 form the connection structure on the the side of the welded zone 50. Since the connection structure can effectively decompose the tensile force, it is advantageous to reduce the force borne by the welded zone 50 and effectively reduce the possibility that the sampling leg 42 is broken in the welded zone 50 and the welded zone 50 itself looses weld.

Figure 3:
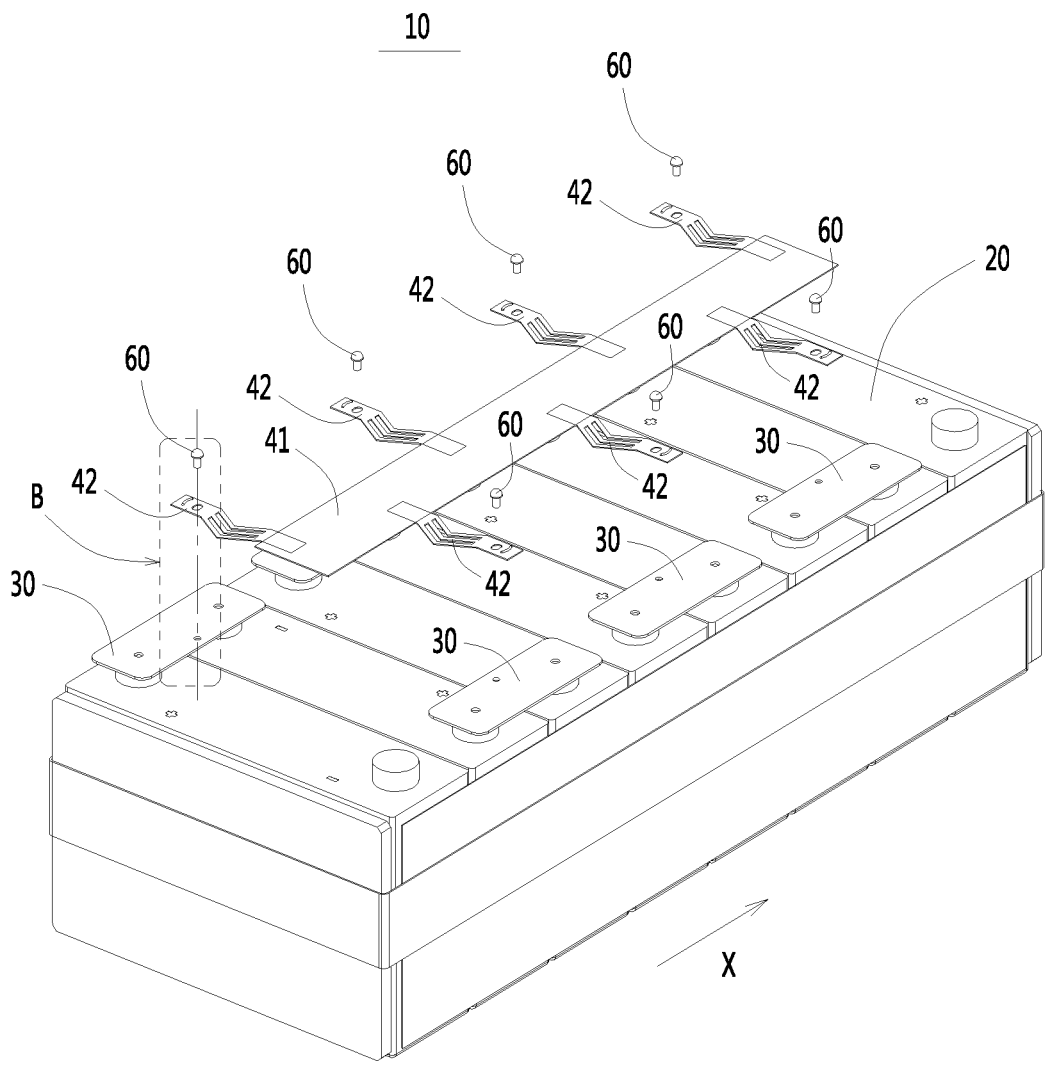
FIG. 3 is an exploded structural view of a battery module according to an embodiment of the application.
Figure 4:
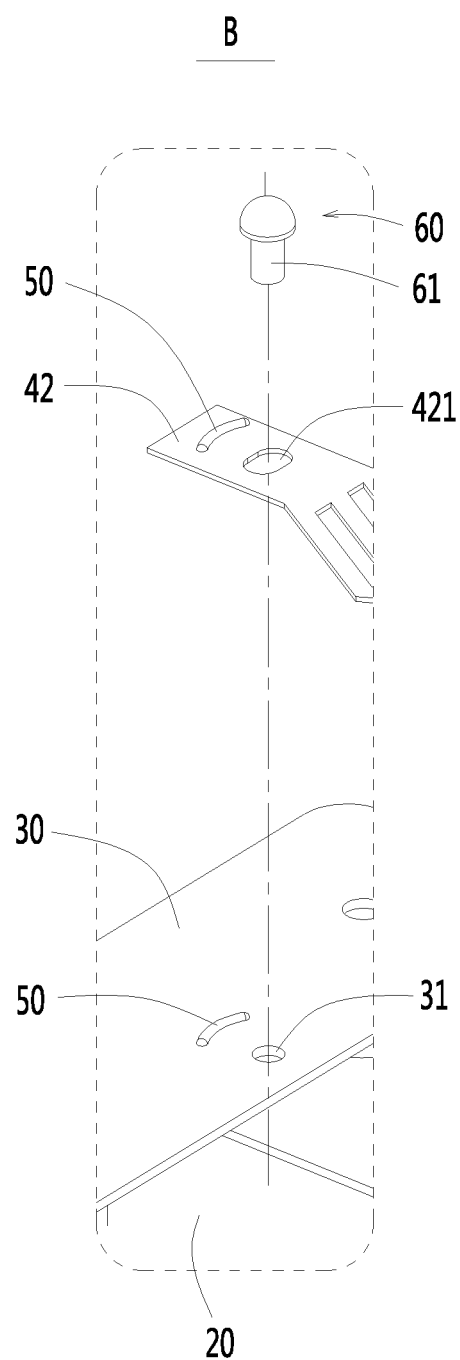
FIG. 4 is an enlarged view at B in FIG. 3.

In an embodiment, as shown in FIGS. 3 and 4, the busbar 30 includes a first through hole 31. The sampling leg 42 includes a second through hole 421. The connector 60 is a riveting member passing through the first through hole 31 and the second through hole 421. The sampling leg 42 and the busbar 30 are riveted by the connector 60. Optionally, the connector 60 is a rivet with a rivet cap and a rivet post. The rivet cap is larger in size than the first through hole 31 and than the second through hole 421. After the rivet is riveted, the rivet cap completely covers the first through hole 31 and the second through hole 421, which effectively reduces the possibility of the sampling leg 42 or the busbar 30 falling out from the rivet cap and improves connection reliability. The rivet post of the rivet passes through the first through hole 31 and the second through hole 421. The sampling leg 42 and the busbar 30 can maintain a movable connection state or a fixed connection state after riveted together by the rivet. In an example, the first through hole 31 and the second through hole 421 are arranged in corresponding positions. The first through hole 31 is a circular hole, and the second through hole 421 is a waist hole. A diameter of the first through hole 31 is smaller than a width of the second through hole 421. In another example, the first through hole 31 and the second through hole 421 are arranged in corresponding positions. The first through hole 31 and the second through hole 421 are both circular holes, and the diameter of the first through hole 31 is smaller than a diameter of the second through hole 421. In this way, since a size of the second through hole 421 is larger than a size of the first through hole 31, it is possible to reduce the difficulty of assembling the first through hole 31 and the second through hole 421 without blocking the first through hole 31. At the same time, the processing tolerance of the first through hole 31 and the second through hole 421 is reduced, and the processing difficulty is reduced. In the embodiment, in the process of welding the sampling leg 42 and the busbar 30, the rivet may serve as a welding positioning catching mark in order to achieve the welding positioning, ensuring that the welded zone 50 is formed at a predetermined position and improving the position accuracy of the welded zone 50. Optionally, the type of welding may be laser welding.

Figure 5:
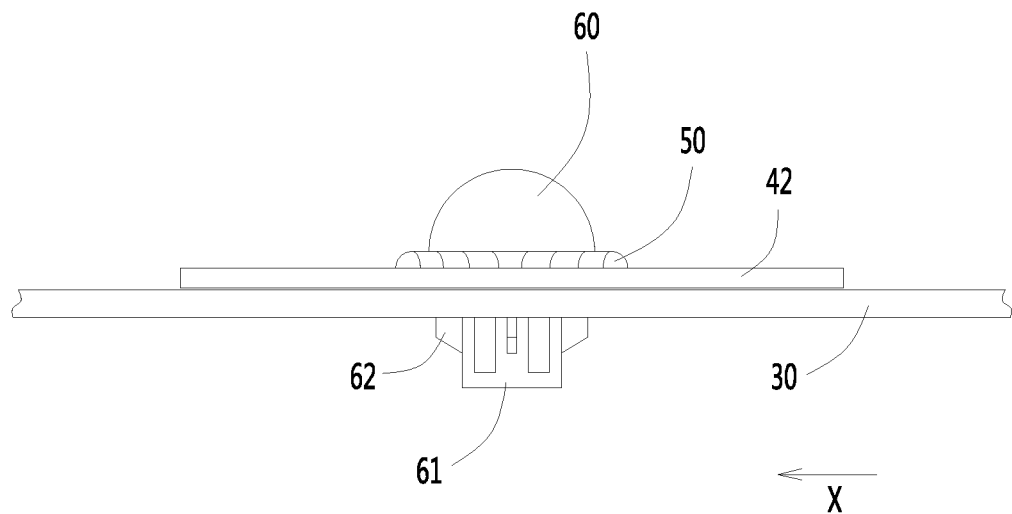
FIG. 5 is a schematic view of a connection structure of a sampling leg, a busbar and a connector according to an embodiment of the application.
Figure 6:
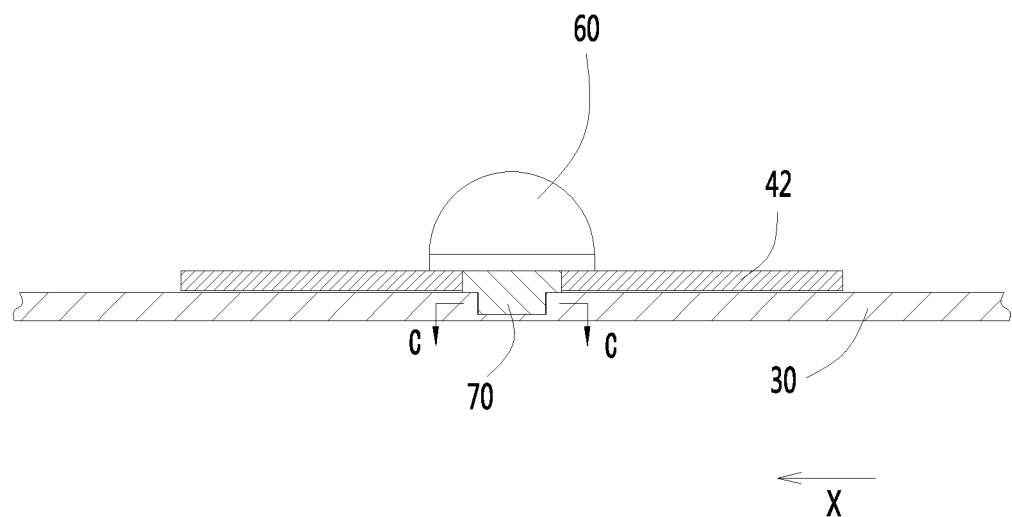
FIG. 6 is a schematic view of a connection structure of a sampling leg, a busbar and a connector according to another embodiment of the application.

In an embodiment, the connector 60 includes a buckle 62. One of the sampling leg 42 and the busbar 30 includes a snap-in portion, and the other is connected to the connector 60. The buckle 62 is engaged with the snap-in portion in order to fixedly connect the sampling leg 42 and the busbar 30. Referring to FIG. 5, the connector 60 includes a columnar portion and a buckle 62 disposed on an outer surface of the columnar portion. The columnar portion includes a central hole and two or more side holes in communication with the central hole. An area between two adjacent side holes on the columnar portion forms an elastic deformation portion, and the buckle 62 is provided on an outer surface of the elastic deformation portion. The busbar 30 includes a snap-in portion on a surface away from the sampling leg 42. Optionally, the snap-in portion may be a groove matching with the buckle 62. After passing through the second through hole 421 and the first through hole 31, the buckle 62 is engaged into the snap-in portion on the busbar 30 to achieve a snap-in connection. In other embodiments, the sampling leg 42 includes a snap-in portion on the surface away from the busbar 30. Optionally, the snap-in portion may be a groove matching with the snap-in portion 62. After passing through the first through hole 31 and the second through hole 421, the buckle 62 is engaged into the snap-in portion on the sampling leg 42 to achieve the snap-in connection. The connector 60 includes a cap portion connected to the columnar portion. In an example, after completion of the snap-in connection, the cap portion of the connector 60 may press against the sampling leg 42 so that the sampling leg 42 are fixedly connected to the busbar 30 with the relative position of the two being immovable. In another example, after completion of the snap-in connection, the cap portion of the connector 60 may not compress the sampling leg 42 so that the sampling leg 42 are movably connected to the busbar 30 with the relative position of the two being movable. When the sampling leg 42 is completely connected to the busbar 30, the relative position of the sampling leg 42 and the busbar 30 maintains stable, thereby facilitating a welding operation on the sampling leg 42 and the busbar 30, and ensuring that the welded zone 50 is located at a predetermined position, improving the positional accuracy of the welded zone 50.

Figure 7:
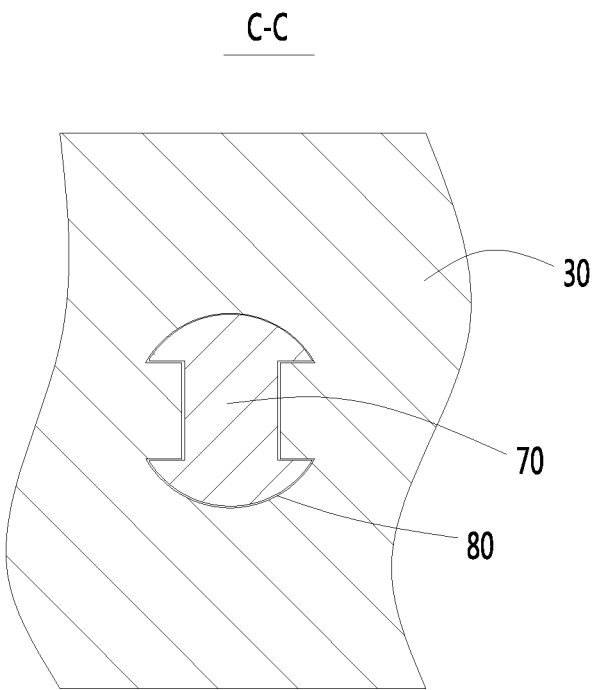
FIG. 7 is a sectional view taken at C-C in FIG. 6.

In an embodiment, the connector 60 includes a post 70. One of the sampling leg 42 and the busbar 30 is connected to the post 70, and the other is provided with a recess 80 for plug-in connection with the post 70. The sampling leg 42 and the busbar 30 are connected in a way of plug-in connection via the post 70 and the recess 80, so that the difficulty for connecting the sampling leg 42 and the busbar 30 may be reduced. In an example, referring to FIG. 6, the connector 60 is a structural part separately provided. The connector 60 includes a cap portion connected to the post 70. The post 70 and the recess 80 are in interference fit with each other, and the cap portion may press against the sampling leg 42, so that the sampling leg 42 and the busbar 30 may remain in a tight fit with a relative position maintained in a fixed state. Alternatively, the post 70 and the recesses 80 are in clearance fit with each other, and the cap portion does not press against the sampling leg 42, so that the sampling leg 42 and the busbar 30 may remain in a loose fit with the sampling leg 42 movable in position relative to the busbar 30. Optionally, as shown in FIG. 7, the post 70 includes a limiting groove, and the busbar 30 is provided with a recess 80 and a limiting protrusion extending toward the recess 80. The limiting protrusion is inserted into the limiting groove to limit the post 70 and the recess 80 relative to each other, thereby reducing the possibility of rotation of the connector 60. In another example, the connector 60 is a one-piece structure integrated with one of the sampling leg 42 and the busbar 30. The post 70 and the recess 80 are in interference fit with each other, so that the sampling leg 42 and the busbar 30 may remain in a tight fit with a relative position maintained in a fixed state. Alternatively, the post 70 and the recess 80 are in clearance fit with each other, so that the sampling leg 42 and the busbar 30 may remain in a loose fit with a variable relative position. When the sampling leg 42 is connected to the busbar 30 by the post 70 and the recess 80, the relative position of the sampling leg 42 and the busbar 30 remains stable, thereby facilitating a welding operation of the sampling leg 42 and busbar 30, and ensuring that the welded zone 50 is located at a predetermined position, improving the positional accuracy of the welded zone 50.

Figure 8:
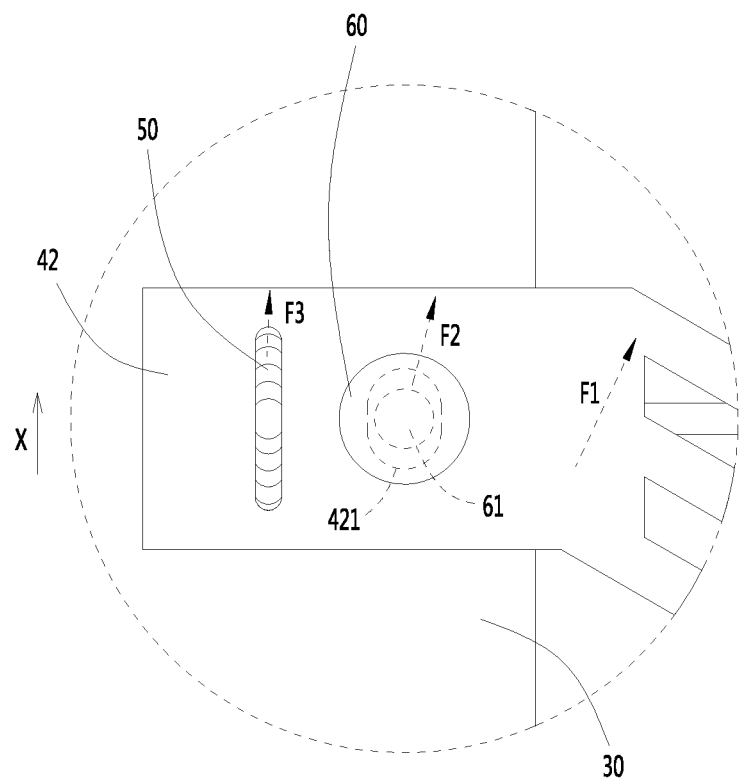
FIG. 8 is a schematic view of a connection structure of a sampling leg and a busbar according to an embodiment of the application.
Figure 9:
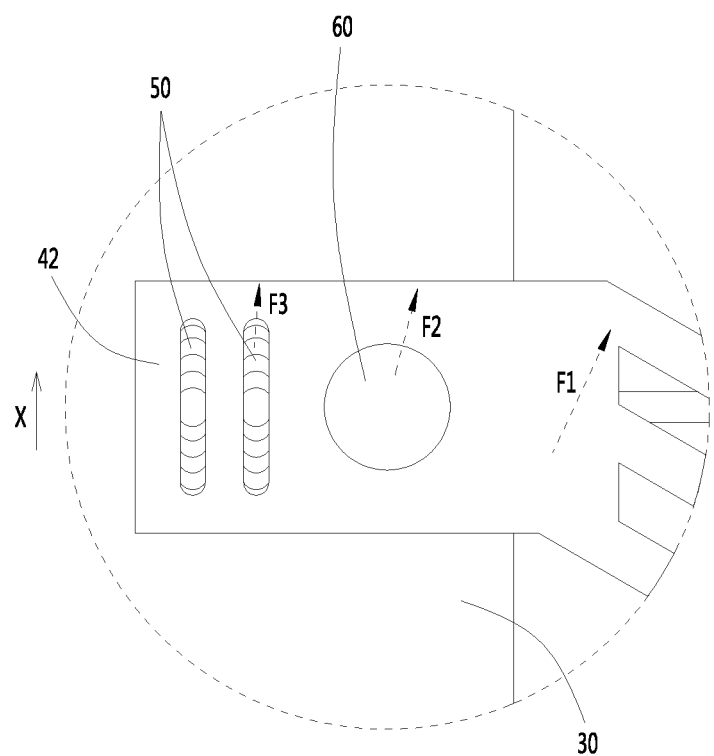
FIG. 9 is a schematic view of a connection structure of a sampling leg and a busbar according to another embodiment of the application.

In an embodiment, the welded zone 50 is a structure extending linearly in the arrangement direction X. Referring to FIG. 8, there is provided with one welded zone 50. The connector 60 is located on a side of the welded zone 50. The sampling leg 42 is connected to the busbar 30 by the connector 60. When the sampling leg 42 is subjected to a tensile force F1 at the side located at the connector 60, a tensile force borne by the connection structure is F2, and a tensile force borne by the welded zone 50 is F3, in which F3 is smaller than F2. In this way, due to decomposition and cushioning of the connection structure formed by the sampling leg 42, the busbar 30, and the connector 60, the tensile force borne by the welded zone 50 is reduced, the possibility of tearing or breaking of the sampling leg 42 at the welded zone 50 is reduced, and the possibility of connection failure due to loosing weld of the welded zone 50 is reduced. In another embodiment, as shown in FIG. 9, there is provided with two welded zones 50, which is advantageous to further improve the reliability and stability of connection between the sampling leg 42 and the busbar 30. The two welded zones 50 are spaced apart in a direction away from the connector 60. The direction away from the connector 60 intersects with the arrangement direction X. It is easily understood that there may be provided with two or more welded zones 50.

Figure 10:
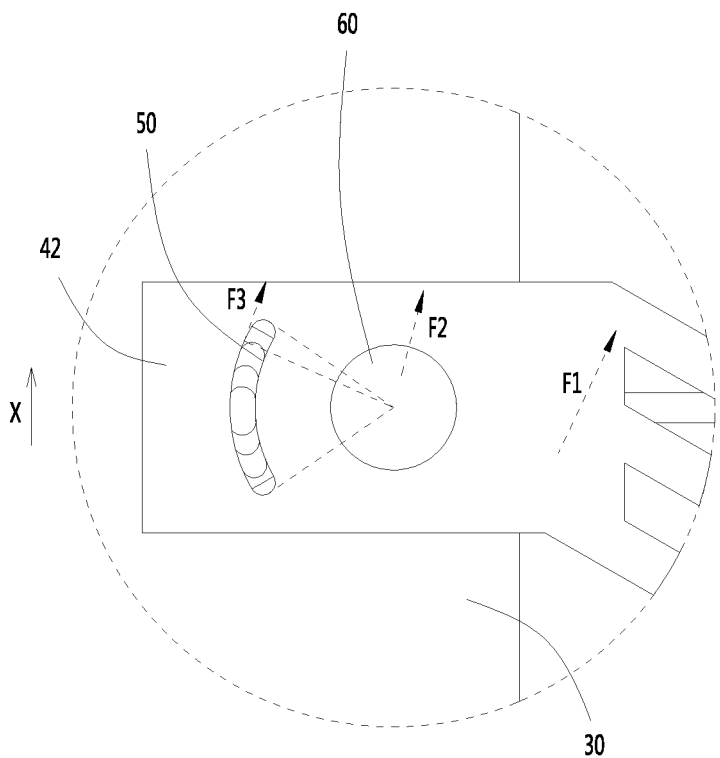
FIG. 10 is a schematic view of a connection structure of a sampling leg and a busbar according to still another embodiment of the application.
Figure 11:
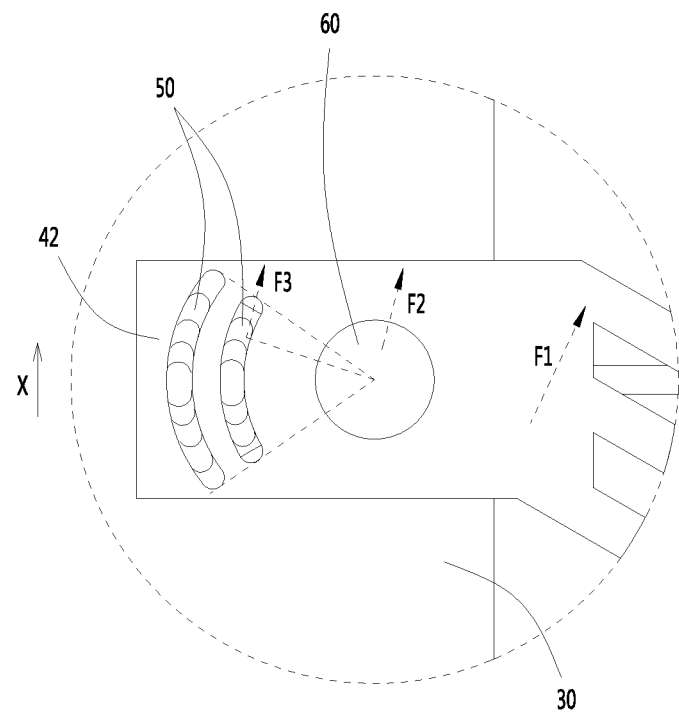
FIG. 11 is a schematic view of a connection structure of a sampling leg and a busbar according to yet another embodiment of the application.

In an embodiment, the connector 60 includes a columnar portion 61 with a central axis. The columnar portion 61 may be a solid structure or a hollow tubular structure. Both the sampling leg 42 and the busbar 30 are connected to the columnar portion 61. Referring to FIG. 10, the welded zone 50 is an arc-shaped structure surrounding the columnar portion 61. In an example, the welded zone 50 is a circular arc-shaped structure. Optionally, the center of the welded zone 50 coincides with the central axis. The welded zone 50 is one-fifth to one-half of a circle. A direction of the tensile force F3 borne by the welded zone 50 is substantially the same as a tangential direction of the welded zone 50. Since the welded zone 50 has the largest welded area and a relatively high connection strength in the tangential direction, it is advantageous to reduce the possibility of connection failure of the welded zone 50 by designing the welded zone 50 as a circular arc-shaped structure. In addition, when the welding operation is performed and the connector 60 is used as a positioning catching mark point, it is advantageous to improve the positional accuracy of the welded zone 50 since the center of the welded zone 50 coincides with the central axis. In another embodiment, as shown in FIG. 11, there is provided with two welded zones 50, which is advantageous to further improve the reliability and stability of connection between the sampling leg 42 and the busbar 30. The two welded zones 50 are spaced apart in a direction away from the connector 60. The direction away from the connector 60 intersects with the arrangement direction X. It is easily understood that there may be provided with two or more welded zones 50.

Figure 12:
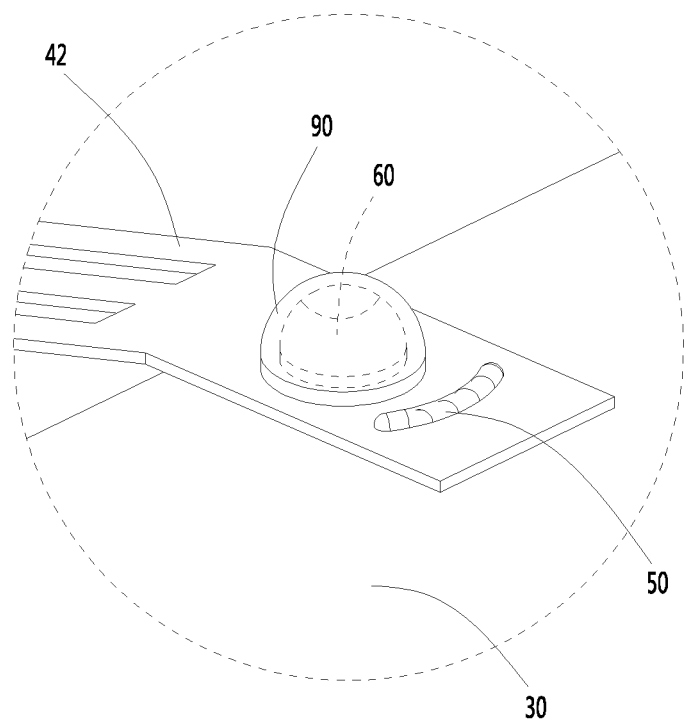
FIG. 12 is an enlarged view at A in FIG. 2.

In an embodiment, as shown in FIG. 12, the battery module 10 further includes an adhesive member 90. The connector 60 is connected to the adhesive member 90. The adhesive member 90 may be used to fixedly connect the connector 60 to other structural part. Here, other structural part may be a harness separator or a cover. In an example, the adhesive member 90 may be an adhesive glue. The adhesive member 90 covers an end of the connector 60 on the side of the sampling leg 42, so that the sampling leg 42 and the connector 60 are connected by the adhesive member 90, further reinforcing the sampling leg 42 and connector 60 and improving the reliability and stability of connection of the sampling leg 42 and the connector 60.

In the the battery module 10 according to the embodiment of the application, the sampling leg 42 and the busbar 30 are electrically connected by welding. The connection structure is formed at a side of the welded zone 50 by connecting the sampling leg 42 and the busbar 30 via the connector 60. In this way, when the sampling leg 42 are subjected to a tensile force, the connection structure has a function of decomposing and buffering the tensile force, so that the tensile force acting on the welded zone 50 is effectively reduced and the possibility of tearing or breaking of the sampling leg 42 at the welded zone 50 due to a large tensile force is reduced, and at the same time, the possibility of failure of the welded zone 50 itself due to loosing weld under a large tensile force is reduced.

An embodiment of the application further provides a vehicle. The vehicle includes a power source and battery modules 10 according to the above embodiments. The power source is used to provide driving force to the vehicle. A plurality of battery modules 10 can be installed inside the vehicle. The battery modules 10 can supply electric energy to the power source.

Although the application has been described with reference to preferred embodiments, it is possible to make various improvements of it and substitute components therein with equivalents without departing from the scope of the application, and in particular, the various technical features mentioned in various embodiments can be combined in any way. The application is not limited to the specific embodiments disclosed herein, but includes all the technical solutions which fall into the scope of the claims.

What is claimed is:

1. A battery module comprising:
a plurality of secondary batteries arranged side by side in an arrangement direction, each of the plurality of secondary batteries having positive and negative terminals protruding upwards at a top-end of the respective secondary battery in a direction perpendicular to the arrangement direction;
one or more busbar arranged on a top of the secondary batteries, each of the one or more busbar being electrically connected to at least two of the plurality of secondary batteries;
a sampling assembly comprising a sampling circuit board and one or more sampling leg, the sampling circuit board being arranged on the top-end of each of the plurality of secondary batteries and extending in the arrangement direction, each of the one or more busbar being connected to sampling circuit board by a respective sampling leg of the one or more sampling leg;
one or more connector, each of the one or more sampling leg and the respective busbar being connected at one or more welded zone by welding and connected with a respective connector of the one or more connector in a way of bolting, riveting or plug-in, wherein each of the one or more connector is located between all of the respective one or more welded zone and the sampling circuit board.

2. The battery module according to claim 1, wherein the sampling leg is movably connected to the connector.

3. The battery module according to claim 1, wherein the busbar comprises a first through hole and the sampling leg comprises a second through hole, the connector being a riveting member passing through the first through hole and the second through hole, the sampling leg and the busbar being riveted by the connector.

4. The battery module according to claim 3, wherein the first through hole and the second through hole are arranged in corresponding positions, the first through hole being a circular hole, the second through hole being a waist hole, a diameter of the first through hole being smaller than a width of the second through hole; or the first through hole and the second through hole are arranged in corresponding positions, the first through hole and the second through hole being both circular holes, the diameter of the first through hole being smaller than a diameter of the second through hole.

5. The battery module according to claim 1, wherein the connector comprises a buckle, one of the sampling leg and the busbar comprising a snap-in portion, and the other being connected to the connector, the buckle being engaged with the snap-in portion in order to connect fixedly the sampling leg to the busbar.

6. The battery module according to claim 1, wherein the connector comprises a post, one of the sampling leg and the busbar being connected to the post, and the other being provided with a recess for plug-in connection with the post.

7. The battery module according to claim 1, wherein the welded zone is a structure extending linearly in the arrangement direction.

8. The battery module according to claim 1, wherein the connector comprises a columnar portion with a central axis, the sampling leg and the busbar being both connected to the columnar portion, the welded zone being an arc-shaped structure surrounding the columnar portion.

9. The battery module according to claim 8, wherein the welded zone is a circular arc-shaped structure, a center of the welded zone coinciding with the central axis, the welded zone being one fifth to one half of a circle.

10. The battery module according to claim 1, wherein the one or more welded zone comprises two or more welded zones spaced apart in a direction away from the connector.

11. The battery module according to claim 1, wherein the battery module further comprises an adhesive member, the connector being connected to the adhesive member.

12. A battery pack, comprising the battery module according to claim 1.

13. The battery module according to claim 1, wherein the sampling leg is fixedly connected to the busbar by the connector.

14. A vehicle comprising:
a power source for providing driving force to the vehicle;
the battery pack according to claim 12 configured to supply electric energy to the power source.

* * * * *